United States Patent [19]

Watanabe et al.

[11] Patent Number: 5,563,194
[45] Date of Patent: Oct. 8, 1996

[54] PROPYLENE RESIN COMPOSITION

[75] Inventors: Kazuyuki Watanabe; Chiaki Okumura, both of Oita, Japan

[73] Assignee: Showa Denko K.K., Tokyo, Japan

[21] Appl. No.: 514,138

[22] Filed: Aug. 11, 1995

[30] Foreign Application Priority Data

Aug. 19, 1994 [JP] Japan .................................. 6-195600

[51] Int. Cl.$^6$ ............................................. C08K 3/34
[52] U.S. Cl. .................... 524/117; 524/451; 524/119; 525/240
[58] Field of Search .................. 525/88, 98, 195, 525/240; 524/117, 119, 451

[56] References Cited

U.S. PATENT DOCUMENTS

| | | | |
|---|---|---|---|
| 4,337,326 | 6/1982 | Shiga et al. | 525/244 |
| 4,480,055 | 10/1984 | Baumann | 521/106 |
| 4,489,195 | 12/1984 | Saeda et al. | 525/323 |
| 4,576,994 | 3/1986 | Dorrer et al. | 525/247 |
| 4,761,461 | 8/1988 | Jaggard et al. | 526/125 |
| 5,001,182 | 3/1991 | Maruya et al. | 524/451 |
| 5,219,913 | 6/1993 | Tomomatsu et al. | 524/451 |
| 5,252,659 | 10/1993 | Koizumi et al. | 524/451 |
| 5,286,552 | 2/1994 | Lesca et al. | 525/240 |
| 5,286,564 | 2/1994 | Cecchin et al. | 525/240 |
| 5,302,454 | 4/1994 | Cecchin et al. | 525/240 |
| 5,302,653 | 4/1994 | Nishio et al. | 525/240 |
| 5,308,908 | 5/1994 | Fukui et al. | 525/240 |
| 5,326,639 | 7/1994 | Leonard et al. | 525/240 |
| 5,332,789 | 7/1994 | Tanaka et al. | 525/240 |
| 5,374,677 | 12/1994 | Nishio et al. | 525/240 |
| 5,391,618 | 2/1995 | Yamamoto et al. | 525/240 |
| 5,438,091 | 8/1995 | Saito et al. | 524/240 |
| 5,453,466 | 9/1995 | Pellegatti et al. | 524/240 |

FOREIGN PATENT DOCUMENTS

| | | | |
|---|---|---|---|
| 0228543 | 7/1987 | European Pat. Off. | C08L 23/10 |
| 047692 | 3/1992 | European Pat. Off. | C08L 23/10 |
| 63-43942 | 2/1988 | Japan . | |
| 4-53851 | 2/1992 | Japan . | |
| 4-275351 | 9/1992 | Japan . | |
| 5-98097 | 4/1993 | Japan . | |
| 2243367 | 10/1991 | United Kingdom | C08L 23/16 |

OTHER PUBLICATIONS

PCT publication WO91/0089 published Jan. 24, 1991–Mitsui Toatsu Chemicals, Inc.

*Primary Examiner*—Veronica P. Hoke
*Attorney, Agent, or Firm*—Sughrue, Mion, Zinn, Macpeak & Seas

[57] ABSTRACT

A propylene resin composition comprising: a polypropylelne having specific physical properties, 25~40% by weight; a propylene-ethylene block copolymer, 25~45% by weight; an ethylene-propylene rubber, 5~15% by weight; an ethylene-α-olefin copolymer, 5~15% by weight; and a talc, 5–30% by weight; is superior in all of the following properties concurrently: rigidity, heat resistance, impact resistance, surface hardness, etc.; and is suited for use in machine parts such as automobile parts; electric and electronic parts; packaging materials, engineering plastic substitutes, etc.

10 Claims, 1 Drawing Sheet

PROPYLENE RESIN COMPOSITION

BACKGROUND OF THE INVENTION

1. Field of the Invention

The present invention relates to a propylene resin composition which is superior in all of the following properties concurrently: rigidity, heat resistance, impact resistance, surface hardness, etc.; and which is suited for use in machine parts, electric and electronic parts, packaging materials, engineering plastic substitutes, etc.

2. Background Art

Polypropylene is widely used, for example, in industrial materials for vehicle parts, electric and electronic parts, etc., and in various packaging materials, since it is generally inexpensive, and has the advantages of light-weight characteristics, mechanical strength, heat resistance, chemical resistance, etc.

In recent years, there has been a strong demand for improvements in quality along with increased functionality and reduced costs for these materials.

As ways to improve the rigidity, impact resistance, heat resistance, etc., of polypropylene, methods have been proposed such as incorporating an ethylene-propylene rubber and a nucleating agent into an ethylene-propylene block copolymer (Japanese Patent Application, Second Publication, No. Sho 60-3420), and incorporating an ethylene-propylene rubber, an ethylene copolymer, and an inorganic filler into an ethylene-propylene block copolymer (Japanese Patent Application, First Publication, No. Hei 4-275351, Japanese Patent Application, First Publication, No. Hei 5-5051, Japanese Patent Application, First Publication, No. Hei 5-98097, Japanese Patent Application, First Publication, No. Hei 5-98098).

However, in the above-mentioned methods, although some characteristics have been improved, heat resistance and rigidity still have not been adequately improved.

SUMMARY OF THE INVENTION

In view of the above, it is an object of the present invention to provide a propylene resin composition which is superior in all of the following properties concurrently: rigidity, heat resistance, impact resistance, surface hardness, etc.

The inventors, through long and careful research, have discovered that the above-mentioned object can be achieved by incorporating an ethylene-propylene rubber and an ethylenic polymer into a specific polypropylene. The present invention is based on this discovery and completely achieves these objects.

More specifically, the present invention provides a propylene resin composition comprising (A) a polypropylene, 25~40% by weight, the polypropylene having the following physical properties (i) to (iv):
 (i) a portion insoluble in xylene at 25° C. by solvent extraction method of not less than 99.0% by weight;
 (ii) an isotactic pentad fraction of not less than 98.5%;
 (iii) an isotactic number-average sequence length of not less than 500; and
 (iv) a total amount of fractions each of which has an isotactic number-average sequence length of not less than 800, according to a column fractionation method, of not less than 10% by weight;

(B) a propylene-ethylene block copolymer, 25~45% by weight;

(C) an ethylene-propylene rubber, 5~15% by weight;

(D) an ethylene-α-olefin copolymer, 5~15% by weight; and (E) a talc, 5~30% by weight;

(in which (A)+(B)+(C)+(D)+(E)=100% by weight).

The propylene resin composition of the present invention is superior in all of the following properties concurrently: rigidity, heat resistance, impact resistance, surface hardness, etc.; and is suited for use in machine parts such as automobile parts; electric and electronic parts; packaging materials, engineering plastic substitutes, etc.

DESCRIPTION OF THE PREFERRED EMBODIMENTS

Figure 1:
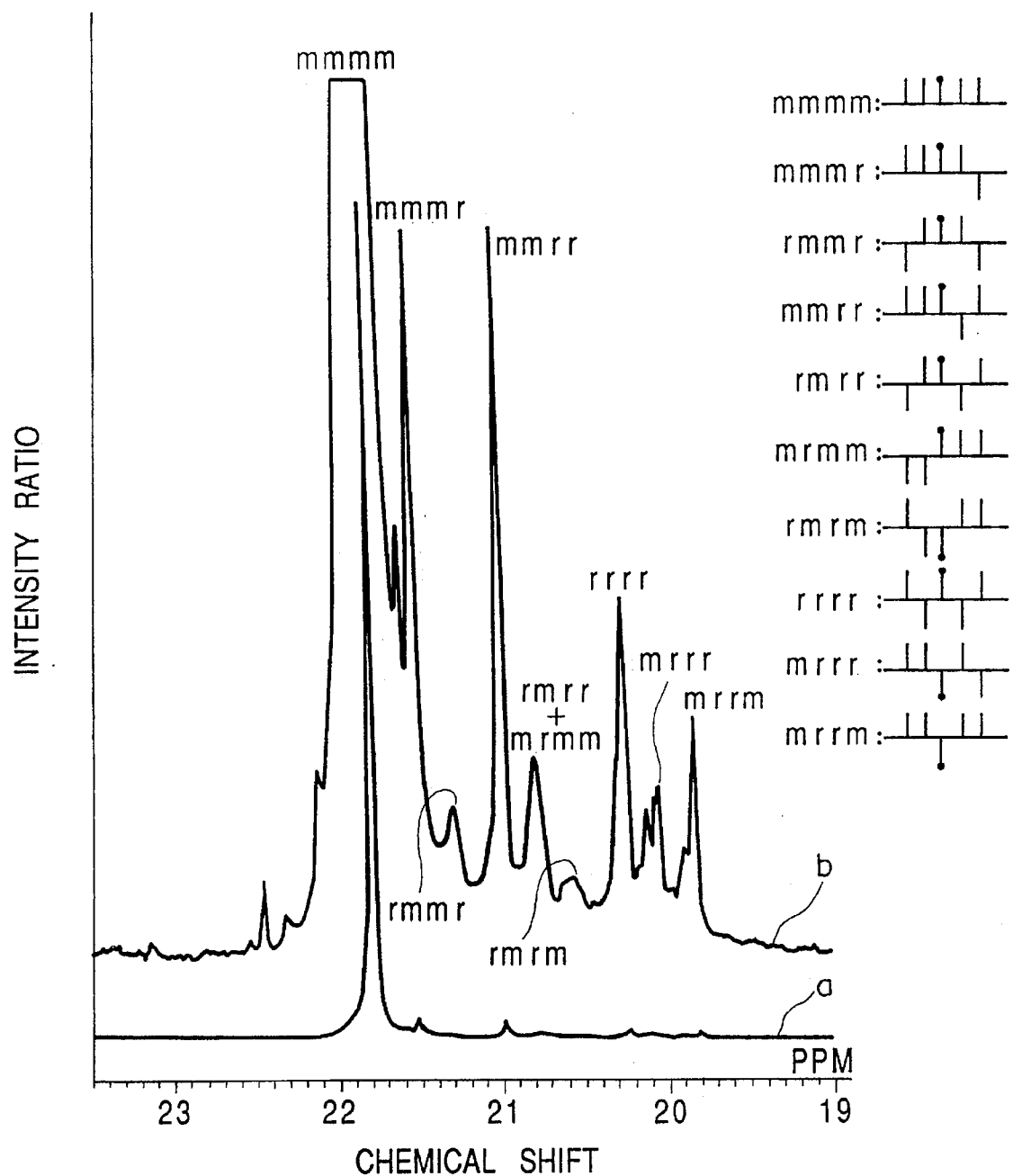
FIG. 1 shows nuclear magnetic resonance spectra for the methyl domain of a polypropylene.

A detailed explanation of the present invention follows.

In the present invention polypropylene (A) is substantially a propylene homopolymer; however, it must have the following properties.

The polypropylene used for the present invention has a portion insoluble in xylene at 25° C. by solvent extraction method (this portion is hereinafter referred to as "xylene-extraction-insoluble portion"; the amount of the xylene-extraction-insoluble portion is hereinafter referred to as "XI") of at least 99.0% by weight, preferably at least 99.5% by weight, and more preferably 99.7% by weight. When XI is less than 99.0% by weight, rigidity and heat resistance of the propylene resin composition are inferior. The determination of XI herein uses a method in which a polypropylene is dissolved in o-xylene at 135° C.; then, by cooling to 25° C., a polymer is precipitated.

It is essential that the isotactic pentad fraction (ii) (hereinafter referred to as "IP") be at least 98.5% by weight, preferably at least 99.0% by weight, and more preferably at least 99.5% by weight. When IP is less than 98.5% by weight, the heat resistance and rigidity properties of the propylene resin are inferior and undesirable.

In addition, IP is the isotactic fraction with respect to pentad units in a polypropylene molecular chain, which is determined using carbon-isotope-based nuclear magnetic resonance ($^{13}$C-NMR). The method for this determination herein follows the method published in A. Zambelli; *Macromolecules*, 6, 925 (1973), 8, 687 (1975), and 13, 267 (1980).

An isotactic number-average sequence length (iii) (hereinafter referred to as "N") of at least 500, preferably of at least 700, and more preferably of at least 800, is necessary. When N is less than 500, the heat resistance and rigidity of the propylene resin composition are inferior.

N indicates an average length of isotactic portions with respect to methyl groups in a polypropylene molecule. The method for determining N herein follows the method described in J. C. Randall, *Polymer Sequence Distribution*, Academic Press, New York, 1977, Chapter 2.

In more detail, a polypropylene is dissolved in a 1,2,4-trichlorobenzene/benzene deuteride solvent mixture which is heated to 130° C. so that the polymer concentration is 10% by weight. This solution is put into a 10 mm diameter glass test tube and a $^{13}$C-NMR spectrum is taken using a method similar to that used for IP. This spectrum is shown in FIG. 1. In FIG. 1, "a" indicates the spectrum of the methyl group domain of the polypropylene, and "b" is an enlargement of the spectrum. The spectrum was obtained by pentad unit, i.e., by units of five adjacent methyl groups. The absorption peaks vary depending on the isotacticity (which consist of 10 structures: mmmm, mmmr, etc.) with respect to the methyl groups. In addition, "b" indicates the correspondence between the absorption peaks and the isotacticity.

Shan-Nong ZHU, et al., *Polymer Journal*, Vol. 15, No. 12, pp 859–868 (1983) describes the "bi-catalytic site model" as a polymerization theory. It proposes that, during polymerization, there are two kinds of active sites; a site on the catalyst side and a site at the end of a polymer; "catalyst-controlled polymerization" takes place on the catalyst side, while "chain end-controlled polymerization" takes place at the end of the polymer. (Details of this theory are described in Junji Furukawa; Macromolecule Essence and Topics 2, *Macromolecule Syntheses*, p. 73, published by Kagakudojin (1986)

In conclusion, the bi-catalytic site model of the above-mentioned publication, in which α is the probability that in catalyst-controlled polymerization (enantiomorphic process), D and L will be added to the polymerization terminal; that is, an index of the degree of disorder within the isotactic sequence;

σ is the probability that in chain end-controlled polymerization (Bernoullian process), a mesoisomer is formed in which a monomer of the same configuration as that of the polymerization terminal is added thereto; and ω is the proportion of α sites;

can theoretically be used to calculate the isotactic intensity of the 10 different kinds of isotacticity of the pentad unit. In addition, α, σ, and ω, are calculated by least squares method so that the above-mentioned theoretical intensity and the above-mentioned NMR measured intensity agree. On the basis of the following equation, the mole fraction of each kind of pentad units is calculated.

TABLE 1

| | | |
|---|---|---|
| MESOISOMER | $A_1$: | mmmm = $\omega (1 - 5\beta + 5\beta^2) + (1 - \omega) \sigma^4$ |
| | $A_2$: | mmmr = $\omega (2\beta - 6\beta^2) + 2 (1 - \omega) \sigma^3 (1 - \sigma)$ |
| | $A_3$: | rmmr = $\omega\beta^2 + (1 - \omega) \sigma^2 (1 - \sigma)^2$ |
| RACEMIC | $A_4$: | mmrr = $\omega (2\beta - 6\beta^2) + 2 (1 - \omega) \sigma^2 (1 - \sigma)^2$ |
| STRUCTURE | $A_5$: | mmrm = $2\omega\beta^2 + 2 (1 - \omega) \sigma^3 (1 - \sigma)$ |
| | $A_6$: | rmrr = $2\omega\beta^2 + 2 (1 - \omega) \sigma (1 - \sigma)^3$ |
| | $A_7$: | rmrm = $2\omega\beta^2 + 2 (1 - \omega) \sigma^2 (1 - \sigma)^2$ |
| | $A_8$: | rrrr = $\omega\beta^2 + 2 (1 - \omega) (1 - \sigma)^4$ |
| | $A_9$: | mrrr = $\omega\beta^2 + 2 (1 - \omega) \sigma (1 - \sigma)^3$ |
| | $A_{10}$: | mrrm = $\omega (\beta - 3\beta^2) + (1 - \omega) \sigma^2 (1 - \sigma)^2$ |

Provided that $\beta = \alpha(1 - \alpha)$.

Next, the number-average sequence length (N) can be determined by applying the above result to the following defining equation described in the above-mentioned Randall publication:

$$N = \frac{\text{the number of meso diad sequences}}{\text{the number of meso diad units}}$$

In practice, N can be determined according to the following equation.

$$N = 1 + (A1 + A2 + A3)/0.5(A4 + A5 + A6 + A7)$$

Furthermore, according to the physical property (iv) of the polypropylene (A), it is essential that the total amount of fractions each of which has an isotactic number-average sequence length (herein after referred to as "$N_f$") of not less than 800 according to a column fractionation method be at least 10% by weight of the whole, preferably 30% by weight of the whole, and more preferably at least 50% by weight of the whole. When the total amount of fractions each of which has $N_f$ of at least 800 is less than 10% by weight of the whole, the advantages of the improvement in rigidity, surface hardness, and heat resistance of the propylene resin composition are degraded.

Here, the column fractionation method is carried out by dissolving in p-xylene at 130° C. the above-mentioned xylene-extraction-insoluble portion; adding Celite to the solution; lowering the temperature at a rate of 10° C./hour until reaching 30° C. so as to allow the solution to adsorb to the Celite to form a slurry; filling a column with the Celite slurry; and obtaining different fractions of a polypropylene separately by using p-xylene as a developer and by raising the temperature, which is 30° C. at the beginning, by 2.5° C. at a time. This method is described in more detail in Masahiro Kakugo et al, *Macromolecules*, Vol. 21, pp 314–319 (1988). The $N_f$ of each fraction of the polypropylene is determined using the above-described method for determining N.

A preferred example of component (A) for the present invention is a propylene homopolymer which is obtained by a polymerization using a modified solid catalytic composition which is obtained by: treating a solid catalyst containing, for example, a magnesium compound, a titanium compound, a halogen containing compound, and an electron donative compound as its essential components with a titanium compound of general formula TiXa.Yb (wherein X is a halogen atom selected from Cl, Br, and I, Y is an electron donative compound, and a is 3 or 4, b is an integer of 3 or less); then, washing the treated catalyst with a halogen-containing compound; and then further washing with a hydrocarbon. A mixture of such propylene homopolymer is also a preferred example of component (A) for the present invention.

Among these examples of component (A), a mixture of a polypropylene having a melt flow rate (measured in conformity with Japan Industrial Standard (JIS) K7210, Table 1, Condition 14; which closely corresponds with ASTM D1238) (hereinafter referred to as "MFR") of 20~50 g/10 minutes, 50~80% by weight, and a polypropylene having an MFR of 3~15 g/10 minutes, 50~20% by weight, is preferred, since such a component (A) gives the propylene resin composition of the present invention a balance of superior properties with regard to rigidity and impact resistance.

In addition, the propylene-ethylene block copolymer (B) for the present invention (hereinafter referred to as "BPP") is a copolymer which can be obtained by using a commonly-known multi-step polymerization method. In this method, a first-step reaction of the first step is carried out in which a propylene is allowed to polymerize, and then, a reaction of the second step is carried out in which the propylene-ethylene copolymer is formed. Examples of the multi-step polymerization method are described in U.S. Pat. Nos. 4,576,994, 4,761,461, and 4,337,326 (which are all incorporated herein by reference), etc.

The propylene-ethylene copolymer rubber content of the above BPP is generally 5~25% by weight, preferably 8~21% by weight, and more preferably 10~18% by weight. In addition, the propylene content of the rubber component is generally 40~65% by weight, preferably 42~63% by weight, and more preferably 45~60% by weight.

The MFR of the BPP is not particularly limited, but generally a BPP with an MFR of 15 g/10 minutes or greater may be useful.

In addition, when a BPP which contains a propylene homopolymer portion, generated in the first-step reaction, having the following properties (i), (ii), (iii), and (iv) is used, the propylene resin composition will tend to have superior properties in terms of rigidity and heat resistance:

(i) a portion insoluble in xylene at 25° C. by solvent extraction method of not less than 99.0%;

(ii) an isotactic pentad fraction of not less than 98.5%;

(iii) an isotactic number-average sequence length of not less than 500; and (iv) a total amount of fractions each of which has an isotactic number-average sequence length of not less than 800, according to a column fractionation method, of not less than 10% by weight.

In addition, the ethylene-propylene rubber (C) (hereinafter called "EPR") used for the present invention is not particularly limited, but one having an MFR of 0.1~5.0 g/10 minutes, and preferably 0.5~4.0 g/10 minutes, is suitable. Furthermore, the propylene content of the EPR is generally 15~35% by weight, and preferably 20~30% by weight.

The EPR used for the present invention can also be a ethylene-propylene-unconjugated diene rubber (EPDM), or a mixture of EPDMs, in which an unconjugated diene such as ethylidenenorbornene, dicyclopentadiene, 1,4-hexadiene, cyclooctadiene, and methylenenorbornene, is further copolymerized as a third component with an EPR.

The ethylene-α-olefin copolymer (D) for the present invention is a copolymer of ethylene and an α-olefin having a carbon number of 4~12. The ratio of the α-olefin in this copolymer is usually 25% by mole or less, preferably 20% by mole or less, and more preferably 5~15% by mole. Specific examples of the α-olefin are 1-butene, 3-methyl-l-butene, 3-methyl-1-pentene, 4-methyl-l-pentene, 4,4-dimethyl-l-pentene, vinylcyclopentane, vinlycyclohexane, etc. One, or a mixture of two or more, of these α-olefins can be used.

A suitable MFR for this copolymer is generally 0.5~15.0 g/10 minutes, preferably 1~13 g/10 minutes, and more preferably 2~10 g/10 minutes. In addition, a suitable density (measured in conformity with JIS K7112, which closely corresponds with ASTM D792) for this copolymer is generally not more than 0.920 g/cm$^3$, preferably not more than 0.915 g/cm$^3$, and more preferably not more than 0.910 g/cm$^3$.

As the talc (E) for the present invention, any talc (which is also called magnesium silicate) can be employed. Talcs are widely used as fillers in synthetic resins and synthetic rubbers, and can be manufactured by the dry method by which a natural ore is coarsely crushed, and then classified and refined. Examples of the use of such a talc is described in U.S. Pat. Nos. 4,480,055, 5,219,913, 5,252,659, and 5,308,908 (which are all incorporated herein by reference), etc. A suitable average particle size for the talc is generally not more than 5 μm, preferably 0.3~3.0 μm, and more preferably 0.4~2.8 μm.

In addition, for the purpose of improving the dispersability or the adhesion of the talc, the talc to be used may be treated with an organotitanate coupling agent, a silane coupling agent, an aluminium coupling agent, a fatty acid, a metallic salt of a fatty acid, fatty acid ester, or the like.

The proportion of component (A) with respect to the composition of the present invention is 25~40% by weight, preferably 27~38% by weight, and more preferably 28~35% by weight. When the proportion of component (A) is less than 25%, the rigidity and heat resistance of the propylene resin composition are degraded. On the other hand, when the proportion exceeds 40% by weight, the impact resistance of the propylene resin composition is degraded.

The proportion of component (B) with respect to the propylene resin composition is 25~40% by weight, preferably 26~38% by weight, and more preferably 27~36% by weight. When the proportion of component (B) is less than 25% by weight, the impact resistance of the propylene resin composition is degraded. On the other hand, when the proportion exceeds 40% by weight, the rigidity and heat resistance of the propylene resin composition are degraded.

The proportion of component (C) with respect to the propylene resin composition is 5~15% by weight, preferably 6~14% by weight, and more preferably 7~13% by weight. When the proportion of component (C) is less than 5% by weight, the impact resistance of the propylene resin composition is degraded. On the other hand, when the proportion exceeds 15% by weight, the rigidity and heat resistance of the propylene resin composition are degraded.

The proportion of component (D) with respect to the propylene resin composition is 5~15% by weight, preferably 6~13% by weight, and more preferably 7~11% by weight. When the proportion of component (D) is less than 5% by weight, the impact resistance of the propylene resin composition is degraded. On the other hand, when the proportion exceeds 15% by weight, rigidity and heat resistance of the propylene resin composition are degraded.

In addition, the proportion of component (E) with respect to the propylene resin composition is 5~30% by weight, preferably 10~28% by weight, and more preferably 15~25% by weight. When the proportion of (E) is less than 5% by weight, the rigidity and heat resistance of the propylene resin composition are degraded. On the other hand, a proportion exceeding 30% by weight is undesirable, since when this is the case, the impact resistance of the propylene resin composition is degraded, and the mold will be contaminated by component (E) as it bleeds out.

In addition, the propylene resin composition of the present invention may contain a nucleating agent (F), which is a phosphate compound defined by the following formula:

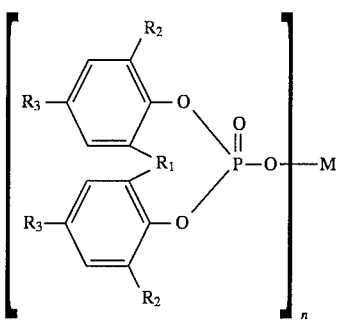

wherein $R_1$ is selected from the group consisting of oxygen, sulfur, and a hydrocarbon group having a carbon number of 1~10; $R_2$ and $R_3$, which may be identical to or different from each other, are selected from the group consisting of hydrogen and a hydrocarbon group having a carbon number of 1~10; M is a metal atom selected from the group consisting of univalent, divalent, and trivalent metal atoms; n represents an integer from 1 to 3; one $R_2$ and another $R_2$ are separate groups or are linked to form a ring; one $R_3$ and another $R_3$ are separate groups or are linked to form a ring; and an $R_2$ and an $R_3$ are separate groups or are linked to form a ring.

Concrete examples of a preferred nucleating agent are sodium 2,2'-methylenebis(4,6-di-t-butylphenyl)phosphate, sodium 2,2'-ethylidenebis(4,6-di-t-butylphenyl)phosphate, lithium 2,2'-methylenebis(4,6-di-t-butylphenyl)phosphate, lithium 2,2'-ethylidenebis( 4,6-di-t-butylphenyl)phosphate, sodium 2,2'-ethylidenebis(4-i-propyl-6-t-butylphenyl)phosphate, lithium 2,2'-methylenebis(4-methyl-6-t-butylphenyl)phosphate, lithium 2,2'-methylenebis(4-ethyl-6-t-butylphenyl)phosphate, calcium bis[2,2'-thiobis(4-methyl-6-t-butylphenyl)phosphate], calcium bis[2,2'-thiobis(4-ethyl-6-t-butylphenyl)phosphate], calcium bis[2,2'-thiobis(4,6-di{-t-}butylphenyl)phosphate], magnesium bis[2,2'-thiobis(4,6-di-t-butylphenyl)phosphate], magnesium bis[2,2'-thiobis(4-t-octylphenyl)phosphate], sodium 2,2'-butylidenebis(4,6'-dimethylphenyl)phosphate, sodium 2,2'-butylidenebis(4,6-di-t-butylphenyl)phosphate, sodium 2,2'-octylmethylenebis(4,6-di-t-butylphenyl)phosphate, calcium bis[2,2'-methylenebis(4,6-di-t-butylphenyl)phosphate], magnesium bis[2,2'-methylenebis(4,6-di-t-butylphenyl)phosphate], barium bis[2,2'-methylenebis(4,6-di-t-butylphenyl)phosphate], sodium 2,2'-methylenebis(4-methyl-6-t-butylphenyl)phosphate, sodium 2,2'-methylenebis(4-ethyl-6-t-butylphenyl)phosphate, sodium (4,4'-dimethyl-5,6'-di-t-butyl-2, 2'-biphenyl)phosphate, calcium bis[(4,4'-dimethyl-6,6'-di-t-butyl-2,2'-biphenyl)phosphate], sodium 2,2'-ethylidenebis(4-n-butyl-6-t-butylphenyl)phosphate, sodium 2,2'-methylenebis(4,6-dimethylphenyl)phosphate, sodium 2,2'-methylenebis(4,6-diethylphenyl)phosphate, potassium 2,2'ethylidenebis(4,6-di-t-butylphenyl)phosphate, calcium 2,2'-ethylidenebis(4,6-di-t-butylphenyl)phosphate, magnesium bis [2,2 '-ethylidenebis (4,6-di-t-butylphenyl)phosphate], barium bis [2,2 '-ethylidenebis ( 4,6-di- t-butylphenyl ) phosphate], aluminium tris [2,2 '-methylenebis (4,6-di-t-butylphenyl)phosphate], aluminium tris [2,2'-ethylidenebis(4,6-di-t-butylphenyl)phosphate], etc. One of these nucleating agents can be used, or two or more can be used in conjunction. In these, sodium 2,2'-methylenebis(4,6-di-t-butylphenyl)phosphate or sodium 2,2'-ethylidenebis(4,6-di-t-butylphenyl)phosphate is particularly preferred.

A suitable amount of the nucleating agent to be added is 0.05~0.40 parts by weight, preferably 0.08~0.30 parts by weight, and more preferably 0.1~0.2 parts by weight, with respect to the total amount of components (A) through (D) of 100 parts by weight.

In order to obtain the resin composition of the present invention, all the components are mixed according to a commonly-known method such as a method using a ribbon blender, a tumbler, a Henschel mixer, or the like; and then the mixture is melt-mixed by using a kneader, mixing roll, banbury mixer, extruder, or the like. A suitable temperature for the melt-mixing is usually 170°~300° C., and preferably 190°~280° C. The obtained composition can be molded into films, sheets, tubes, bottles, or the like, by a commonly-known method such as a melt molding method or a compression molding method. The molded article can be used alone, or it can be used in a laminated body with another material being laminated together therewith.

Furthermore, any additive used by one having ordinary skill in the art such as an antioxidant, a weatherproof stabilizer, an anti-static agent, a lubricant, an antiblocking agent, an anti-fogging agent, a pigment, a plasticizer, a flexibilizer, or the like may be arbitrarily incorporated into the resin composition of the present invention, as long as the addition of the additive does not obstruct the above-mentioned object of the present invention.

EXAMPLES

The present invention will be explained further in detail referring to the following examples.

In the following, the MFRs of propylenes and the ethylene-propylene rubbers were measured in conformity with JIS K7210, Table 1 Condition 14, which closely corresponds with ASTM D1238. The MFRs of ethylene-α-olefin copolymers were measured in conformity with Condition 4 of the same table. Flexural moduli were measured in conformity with JIS K7203, which closely corresponds with ASTM D790. Values of Izod impact strength were measured with test pieces having a notch in conformity with JIS K7110, which closely corresponds with ASTM D256. Deflection temperatures under load were measured with a load of 4.6 kg in conformity with JIS K7207B, which closely corresponds with ASTM D648. Values of Rockwell hardness were measured with scale R in conformity with JIS K7202, which closely corresponds with ASTM D785.

In addition, an example of the production of the used polypropylene is shown below.

(a) Preparation of Solid Catalyst 56.8 g (597 mmol) of anhydrous magnesium chloride were completely dissolved in a liquid mixture of 100 g (174 mmol) of anhydrous ethanol, 500 ml of vaseline oil (CP15N; manufactured by IDEMITSU KOHSAN CO., LTD.), and 500 ml of silicone oil (KF96; manufactured by SHINETSU SILICONE CO.), at 120° C. in nitrogen atmosphere. This mixture was stirred at 3000 r.p.m. for 3 minutes at 120° C. using a TK Homomixer manufactured by TOKUSHU KIKA KOGYO CO. Next, while maintaining the stirring and while cooling, the mixture was transferred into 2 liters of anhydrous heptane in such a manner that the anhydrous heptane was kept at 0° C. or lower. The obtained white solid was thoroughly washed with anhydrous heptane and vacuum-dried at room temperature.

30 g of the obtained white solid were suspended in 200 ml of anhydrous heptane, and while stirring, 500 ml (4.5 mol) of titanium tetrachloride were added dropwise over a one hour period. Next, the mixture was heated. When the temperature reached 40° C., 4.96 g (17.8 mmol) of diisobutyl phthalate were added. The mixture was further heated to 100° C. over about an hour. Next, after the mixture was allowed to react at 100° C. for 2 hours, the solid portion was collected by hot filtration. 500 ml (4.5 mol) of titanium tetrachloride were added to the obtained solid portion. The mixture was allowed to react at 120° C. while stirring, and then hot filtration was again conducted to collect the obtained solid portion. The collected solid portion was washed 7 times with 1 liter of hexane at 60° C., and 3 times with 1 liter of hexane at room temperature.

(b) Preparation of $TiCl_4[C_6H_4(COO.i-C_4H_9)_2]$ 27.8 g (100 mmol) of diisobutyl phthalate were added dropwise to a solution of 19 g (100 mmol) of titanium tetrachloride in 1 liter of hexane over 30 minutes, while the temperature of the mixture was maintained at 0° C. After the addition was finished, the mixture was heated to 40° C., and was allowed to react for 30 minutes. When the reaction was completed, the solid portion was collected and washed 5 times with 500 ml of hexane, and thus the desired product was obtained.

(c) Preparation of catalytic composition for polymerization 20 g of the solid catalyst obtained in (a) above were suspended in 300 ml of toluene, and were treated for 1 hour with 5.2 g (11 mmol) of $TiCl_4[C_6H_4(COO.i-C_4H_9)2]$ obtained in (b) above, so as to support the catalyst. When this treatment for supporting the catalyst was completed, the solid portion was collected by hot filtration, and was suspended again in a mixture of 300 ml of toluene and 10 ml (90 mmol) of titanium tetrachloride, in which the solid portion was washed by stirring at 90° C. for 1 hour. After collecting the solid portion, it was washed 5 times with 500 ml of toluene at 90° C. and 3 times with 500 ml of hexane at room temperature.

Prepolymerization

In nitrogen atmosphere, 500 ml of n-heptane, 6.0 g (53 mmol) of triethylaluminium, 3.9 g (17 mmol) of dicyclopentyldimethoxysilane, and 10 g of the catalytic composition for polymerization obtained in (c) above were put in an autoclave having a volume of 3 liters, and stirred for 5 minutes at a temperature in the range of 0~5° C. Next, a propylene was supplied into the autoclave in such an amount that 10 g of the propylene would be polymerized for each 1 g of the catalytic composition for polymerization. Prepolymerization was then carried out at a temperature range of 0~5° C. for 1 hour. The obtained prepolymerized solid catalytic composition was washed 3 times with 500 ml of n-heptane, and was used in the main polymerization below.

Main polymerization

In nitrogen atmosphere, 2.0 g of the prepolymerized solid catalytic composition prepared by the above method, 11.4 g (100 mmol) of triethylaluminium, and 6.84 g (30 mmol) of dicyclopentyldimethoxysilane were put in an autoclave with a stirring device having a volume of 60 liters. After the autoclave was heated to 70° C., a propylene was fed thereto, and polymerization was carried out for 1 hour. The unreacted propylene and hydrogen were removed thereafter, and thus the polymerization was terminated. As a result, a polypropylene (hereinafter referred to as "PP1") with an MFR of 25.1 g/10 minutes was obtained.

In the same way, except that an amount of hydrogen charged during polymerization was varied, a polypropylene (hereinafter referred to as "PP2") with an MFR of 43.7 g/10 minutes, a polypropylene (hereinafter referred to as "PP3") with an MFR of 7.0 g/10 minutes, and a polypropylene (hereinafter referred to as "PP4") with an MFR of 12.4 g/10 minutes were obtained.

In addition, the following 5 kinds of polypropylene were used for comparative examples:

a polypropylene (hereinafter referred to as "PP5") with an MFR of 32.2 g/10 minutes; a polypropylene (hereinafter referred to as "PP6") with an MFR of 3.2 g/10 minutes; and a polypropylene (hereinafter referred to as "PP7") with an MFR of 0.8 g/10 minutes; PP5, PP6, PP7 being obtained by using as catalytic components titanium trichloride manufactured by TOSOH AKZO CO., and diethylaluminium chloride, and by varying the concentration of hydrogen; and a polypropylene (hereinafter referred to as "PP8") with an MFR of 6.8 g/10 minutes; a polypropylene (hereinafter referred to as "PP9") with an MFR of 10.8 g/10 minutes; PP8 and PP9 being obtained via prepolymerization and main polymerization by using the solid catalyst obtained in (a) instead of the catalytic composition obtained according to the operations of (a)~(c) above; in the polymerization for PP8, dicyclopentyldimethoxysilane and triethylaluminium in the molar ratio of 0.01 being used; and in the polymerization for PP9, dicyclopentyldimethoxysilane and triethylaluminium in the molar ratio of 0.3 being used.

With regard to the above polypropylenes, XI, IP, N, and $N_f$ were measured. The results are shown in Table 2.

The conditions for the measurement of IP are shown below:

Measuring device: JNM-GSX400 manufactured by JEOL LTD.

Measuring mode: proton decoupling method

Pulse width: 8.0 µs

Pulse repetition time: 3.0 s

Cumulative number of repetitions: 20000 times

Solvent: a mixture of 1,2,4-trichlorobenzene and benzene deuteride (75/25% by weight)

Internal Circulation: hexamethyldisiloxane

Sample concentration: 300 mg/3.0 ml solvent

Measuring temperature: 120° C.

In addition, propylene-ethylene block copolymers were obtained carrying out preparation of catalyst and prepolymerization in the same manner as for PP1 above, and then carrying out the following main polymerization.

First-step Polymerization: polymerization for propylene homopolymer

In nitrogen atmosphere, 2.0 g of the prepolymerized solid catalytic composition prepared by the above-mentioned method, 11.4 g of triethylaluminium, 6.84 g of dicyclopentyldimethoxysilane were put in an autoclave with a stirring device having a volume of 60 liters. Next, the propylene and hydrogen were put into the autoclave, the temperature was raised to 70° C., and polymerization was carried out for 1 hour. Then, the unreacted propylene was removed, and thus the reaction was terminated. After the reaction had finished, the reaction product was sampled.

Second-step Polymerization: polymerization for propylene-ethylene copolymer

Next, hydrogen was supplied to the autoclave while the ethylene/propylene mixture ratio were being controlled, and reaction took place at 70° C. for 40 minutes. After the reaction, the unreacted gas was removed, and a copolymer (hereinafter referred to as "BPP1") was obtained in which the rubber component content was 14.5% by weight, and the propylene content in the rubber component was 55.1% by weight.

Similarly, by changing the ethylene/propylene mixture ratio, a copolymer (hereinafter referred to as "BPP2") with a rubber component content of 19.3% by weight and a propylene content in the rubber component of 62.4% by weight; and a copolymer (hereinafter referred to as "BPP3") with a rubber component content of 28.6% by weight and a propylene content in the rubber component was 67.9% by weight were obtained.

XI, IP, N, and $N_f$ were measured with regard to each sample of propylene homopolymer taken during the preparation of the copolymer. The results are shown in Table 2.

TABLE 2

| Type of Polypropylene | XI (% by weight) | IP (%) | N (—) | $N_f$ (% by weight) |
|---|---|---|---|---|
| PP1 | 99.5 | 99.5 | 801 | 80 |
| PP2 | 99.5 | 99.5 | 790 | 73 |
| PP3 | 99.2 | 99.4 | 783 | 65 |
| PP4 (Comparative) | 99.7 | 99.5 | 698 | 72 |
| PP5 | 98.6 | 97.7 | 225 | 1 or less |
| PP6 | 98.4 | 97.4 | 108 | 1 or less |
| PP7 | 98.3 | 96.9 | 72 | 1 or less |
| PP8 | 97.9 | 96.7 | 152 | 30 |
| PP9 | 97.1 | 95.8 | 93 | 21 |
| BPP1 | 99.5 | 99.5 | 821 | 82 |
| BPP2 | 99.5 | 99.5 | 790 | 78 |
| BPP3 | 98.1 | 98.1 | 123 | 7 |

As ethylene-propylene rubbers, a rubber (hereinafter referred to as "EPR1") with an MFR of 4.5 g/10 minutes and a propylene content of 30.3% by weight; a rubber (hereinafter referred to as "EPR2") with an MFR of 1.1 g/10 minutes and a propylene content of 26.1% by weight; and a rubber (hereinafter referred to as "EPR3") with an MFR of 6.5 g/10 minutes and a propylene content of 36.8% by weight were used.

As ethylene-α-olefin copolymers, a copolymer (hereinafter referred to as "PEC1") with an MFR of 1.4 g/10 minutes, a density of 0.905 g/cm³, and a 1-butene content of 8.7% by mole; a copolymer (hereinafter referred to as "PEC2") with an MFR of 7.5 g/10 minutes, a density of 0.899 g/cm³, and a 1-butene content of 10.9% by mole; and a copolymer (hereinafter referred to as "PEC3") with an MFR of 18.7 g/10 minutes, a density of 0.915 g/cm³, and a 1-butene content of 26% by mole were used.

As talcs, a talc (hereinafter referred to as "TALC1") with an average particle size of 2.3 μm, and a specific surface area of 4.0 m²/g; and a talc (hereinafter referred to as "TALC2") with an average particle size of 11.0 μm, and a specific surface area of 3.4 m²/g were used.

In addition, sodium 2,2'-methylenebis(4,6-di-t-butylphenyl)phosphate was used as a nucleating agent.

Examples 1~7, and Comparative Examples 1~7

For each Example and Comparative Example, a polypropylene, a propylene-ethylene block copolymer, an ethylene-propylene rubber, an ethylene-α-olefin copolymer, a talc, and a nucleating agent (types and proportions of these components being shown in Table 3; the proportions being expressed in parts by weight with respect to 100 parts by weight of the total amount of the resin) were mixed using a Supermixer (model SMV20) manufactured by KAWATA MFG. CO., LTD., and the mixture was palletized using a biaxial extruder (model AS30) manufactured by NAKATANI MACHINE CO., LTD). Each pellet obtained was made into a test piece using an injection molding machine manufactured by TOSHIBA MACHINE CO., LTD., at 220° C., with a mold cooling temperature of 50° C. After leaving the obtained test piece in a thermostatic chamber for 2 days at 23° C. with the relative humidity of 50% temperature, flexural modulus, Izod impact strength (using the test piece with a notch), the deflection temperature under load, and Rockwell hardness were measured. The results obtained are shown in Table 4.

TABLE 3

| | Polypropylene | | Propylene-ethylene block copolymer | | Ethylene-propylene rubber | | Ethylene-α-olefin copolymer | | Talc | | Nucleating agent |
|---|---|---|---|---|---|---|---|---|---|---|---|
| | Type | Proportion (% by wt) | Type | Proportion (% by wt) | Type | Proportion (% by wt) | Type | Proportion (% by wt) | Type | Proportion (% by wt) | Proportion (Parts by wt) |
| Example 1 | PP1 | 35 | BPP1 | 28 | EPR1 | 10 | PEC1 | 10 | TALC1 | 17 | — |
| Example 2 | PP2 | 31 | BPP2 | 31 | EPR2 | 11 | PEC3 | 13 | TALC1 | 14 | — |
| Example 3 | PP3 | 30 | BPP3 | 27 | EPR1 | 11 | PEC1 | 10 | TALC1 | 22 | 0.1 |
| Example 4 | PP4 | 35 | BPP2 | 30 | EPR3 | 10 | PEC2 | 11 | TALC1 | 14 | — |
| Example 5 | PP2 | 38 | BPP2 | 36 | EPR2 | 9 | PEC2 | 8 | TALC2 | 9 | — |
| Example 6 | PP1 / PP3 | 17 / 14 | BPP1 | 31 | EPR1 | 7 | PEC1 | 9 | TALC1 | 22 | 0.15 |
| Example 7 | PP2 / PP4 | 20 / 18 | BPP1 | 28 | EPR1 | 8 | PEC2 | 8 | TALC1 | 18 | — |
| Comparative Example 1 | PP5 | 37 | BPP3 | 34 | EPR2 | 13 | PEC3 | 12 | TALC2 | 4 | — |
| Comparative Example 2 | PP6 | 20 | BPP1 | 50 | EPR2 | 9 | PEC1 | 8 | TALC1 | 13 | — |
| Comparative Example 3 | PP8 | 30 | BPP2 | 25 | EPR3 | 17 | PEC2 | 18 | TALC2 | 10 | — |
| Comparative Example 4 | PP9 | 25 | BPP3 | 22 | EPR1 | 18 | PEC3 | 18 | TALC1 | 17 | — |
| Comparative Example 5 | PP1 | 20 | BPP1 | 40 | EPR3 | 15 | PEC2 | 15 | TALC1 | 10 | — |
| Comparative Example 6 | PP2 | 52 | BPP2 | 27 | EPR3 | 4 | PEC2 | 3 | TALC1 | 13 | 0.2 |
| Comparative Example 7 | PP7 / PP9 | 20 / 20 | BPP3 | 17 | EPR1 | 6 | PEC1 | 6 | TALC1 | 31 | — |

TABLE 4

|  | MFR (g/10 min) | Flexural Modulus (kg/cm$^2$) | Izod Impact Strength (test piece with notch) (kg · cm/cm) | Deflection Temperature Under Load (°C.) | Rockwell Hardness (R Scale) |
| --- | --- | --- | --- | --- | --- |
| Example 1 | 13 | 28100 | 3.9 | 147 | 91 |
| Example 2 | 17 | 27500 | 4.8 | 141 | 90 |
| Example 3 | 19 | 28500 | 4.3 | 144 | 88 |
| Example 4 | 18 | 27300 | 4.5 | 146 | 89 |
| Example 5 | 18 | 28900 | 5.1 | 146 | 87 |
| Example 6 | 20 | 28800 | 5.3 | 148 | 89 |
| Example 7 | 16 | 27800 | 4.8 | 144 | 90 |
| Comparative Example 1 | 16 | 16500 | 4.8 | 109 | 75 |
| Comparative Example 2 | 17 | 17200 | 5.5 | 112 | 78 |
| Comparative Example 3 | 15 | 17500 | 6.1 | 108 | 71 |
| Comparative Example 4 | 18 | 19100 | 4.6 | 122 | 82 |
| Comparative Example 5 | 20 | 19200 | 4.5 | 106 | 69 |
| Comparative Example 6 | 15 | 28300 | 2.6 | 140 | 94 |
| Comparative Example 7 | 18 | 28600 | 2.1 | 142 | 92 |

We claim:

1. A propylene resin composition comprising:

a polypropylene, 25~40% by weight, said polypropylene having as its physical properties:
    a portion insoluble in xylene at 25° C. by solvent extraction method of not less than 99.0% by weight;
    an isotactic pentad fraction of not less than 98.5%;
    an isotactic number-average sequence length of not less than 500; and
    a total amount of fractions each of which has an isotactic number-average sequence length of not less than 800, according to a column fractionation method, of not less than 10% by weight;

a propylene-ethylene block copolymer, 25~45% by weight;

an ethylene-propylene rubber, 5~15% by weight;

an ethylene-α-olefin copolymer, 5~15% by weight; and a talc, 5~30% by weight.

2. A propylene resin composition according to claim 1, wherein said polypropylene is a mixture comprising:
    a polypropylene having a melt flow rate of 20~50 g/10 minutes, 50~80% by weight; and a polypropylene having a melt flow rate of 3~15 g/10 minutes, 50~20% by weight;

wherein each of said polypropylenes in said mixture has as its physical properties:
    a portion insoluble in xylene at 25° C. by solvent extraction method of not less than 99.0% by weight;
    an isotactic pentad fraction of not less than 98.5%;
    an isotactic number-average sequence length of not less than 500; and
    a total amount of fractions each of which has an isotactic number-average sequence length of not less than 800, according to a column fractionation method, of not less than 10% by weight.

3. A propylene resin composition according to claim 1, wherein said propylene-ethylene block copolymer comprises a propylene-ethylene copolymer rubber component in an amount of 5~25% by weight, and said rubber component comprises a propylene homopolymer section in an amount of 45~65% by weight.

4. A propylene resin composition according to claim 2, wherein said propylene-ethylene block copolymer comprises a propylene-ethylene copolymer rubber component in an amount of 5~25% by weight, and said rubber component comprises a propylene homopolymer section in an amount of 45~65% by weight.

5. A propylene resin composition according to claim 3, wherein said propylene homopolymer section has as its physical properties:
    a portion insoluble in xylene at 25° C. by solvent extraction method of not less than 99.0%;
    an isotactic pentad fraction of not less than 98.5%;
    an isotactic number-average sequence length of not less than 500; and
    a total amount of fractions each of which has an isotactic number-average sequence length of not less than 800, according to a column fractionation method, of not less than 10% by weight.

6. A propylene resin composition according to claim 4, wherein said propylene homopolymer section has as its physical properties:
    a portion insoluble in xylene at 25° C. by solvent extraction method of not less than 99.0%;
    an isotactic pentad fraction of not less than 98.5%;
    an isotactic number-average sequence length of not less than 500; and
    a total amount of fractions each of which has an isotactic number-average sequence length of not less than 800, according to a column fractionation method, of not less than 10% by weight.

7. A propylene resin composition according to claim 1, wherein said talc has an average particle size of not larger than 4.0 μm, and a specific surface area of not smaller than 3 m$^2$/g.

8. A propylene resin composition according to claim 2, wherein said talc has an average particle size of not larger than 4.0 μm, and a specific surface area of not smaller than 3 m²/g.

9. A propylene resin composition according to claim 1, wherein said propylene resin composition further comprises a nucleating agent in an amount of 0.05~0.4 parts by weight with respect to 100 parts by weight of a total amount of said polypropylene, said propylene-ethylene block copolymer, said ethylene-propylene rubber, said ethylene-α-olefin copolymer, and said talc; said nucleating agent defined by the following formula:

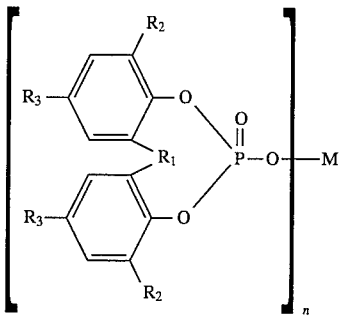

wherein $R_1$ is selected from the group consisting of oxygen, sulfur, and a hydrocarbon group having a carbon number of 1~10; $R_2$ is selected from the group consisting of hydrogen and a hydrocarbon group having a carbon number of 1~10; $R_3$ is selected from the group consisting of hydrogen and a hydrocarbon group having a carbon number of 1~10; M is a metal atom selected from the group consisting of univalent, divalent, and trivalent metal atoms; n represents an integer from 1 to 3; one $R_2$ and another $R_2$ are separate groups or are linked to form a ring; one $R_3$ and another $R_3$ are separate groups or are linked to form a ring; and an $R_2$ and an $R_3$ are separate groups or are linked to form a ring.

10. A method for concurrently achieving a flexural modulus of at least 15,000 kg/cm², an Izod impact strength of at least 3.0 kg.cm/cm, a deflection temperature of at least 130° C. under load, and a Rockwell surface hardness of at least 70, in a propylene resin composition comprising mixing (a) polypropylene, 25~40% by weight, said polypropylene having as its physical properties: (i) a portion insoluble in xylene at 25° C. by solvent extraction method of not less than 99.0% by weight; (ii) an isotactic pentad fraction of not less than 98.5%; (iii) an isotactic number-average sequence length of not less than 500; and (iv) a total amount of fractions each of which has an isotactic number-average sequence length of not less than 800, according to a column fractionation method, of not less than 10% by weight;

(b) a propylene-ethylene block copolymer, 25~45% by weight;

(c) an ethylene-propylene rubber, 5~15% by weight;

(d) an ethylene α-olefin copolymer, 5~15% by weight; and (e) a talc, 5~30% by weight.

* * * * *